(12) United States Patent
Zhao et al.

(10) Patent No.: US 12,296,836 B2
(45) Date of Patent: May 13, 2025

(54) CALIBRATION OF SENSORS IN AUTONOMOUS VEHICLE APPLICATIONS

(71) Applicant: Waymo LLC, Mountain View, CA (US)

(72) Inventors: Sheng Zhao, Cupertino, CA (US); Antonio Teran Espinoza, Cambridge, MA (US); Volker Grabe, Redwood City, CA (US); Changchang Wu, Bothell, WA (US)

(73) Assignee: Waymo LLC, Mountain View, CA (US)

( * ) Notice: Subject to any disclaimer, the term of this patent is extended or adjusted under 35 U.S.C. 154(b) by 693 days.

(21) Appl. No.: 17/526,514

(22) Filed: Nov. 15, 2021

(65) Prior Publication Data
US 2023/0150518 A1  May 18, 2023

(51) Int. Cl.
*B60W 50/00* (2006.01)
*B60W 60/00* (2020.01)
*G06F 17/17* (2006.01)

(52) U.S. Cl.
CPC ...... *B60W 50/0098* (2013.01); *B60W 60/001* (2020.02); *G06F 17/17* (2013.01); *B60W 2050/0088* (2013.01); *B60W 2420/403* (2013.01); *B60W 2420/408* (2024.01)

(58) Field of Classification Search
CPC ........... B60W 50/0098; B60W 60/001; B60W 2050/0088; B60W 2420/4036; B60W 2420/408; G06F 17/17; G01S 7/4026; G01S 7/4091; G01S 7/4972; G01S 13/34; G01S 17/34; G01S 17/931; G01S 13/42; G01S 13/865; G01S 13/867; G01S 13/931; G01S 17/42; G01S 17/87; G06T 7/80; G01R 35/00
See application file for complete search history.

(56) References Cited

U.S. PATENT DOCUMENTS

| | | | |
|---|---|---|---|
| 2007/0182623 A1* | 8/2007 | Zeng ..................... | G01S 13/862 342/174 |
| 2020/0033444 A1* | 1/2020 | Marsch ................. | G01S 13/931 |
| 2021/0033712 A1* | 2/2021 | Yang ..................... | G01S 7/4808 |

OTHER PUBLICATIONS

Extended European Search Report (EESR), for Application No. 22207271.2—Communication pursuant to Article 62 EPC (R. 63 EPC), dated Apr. 13, 2023, 15 pages.
J. Solà, "Consistency of the monocular EKF-SLAM algorithm for three different landmark parametrizations," 2010 IEEE International Conference on Robotics and Automation, 2010, pp. 3513-3518.

* cited by examiner

*Primary Examiner* — Thomas Ingram
(74) *Attorney, Agent, or Firm* — Lowenstein Sandler LLP

(57) ABSTRACT

The described aspects and implementations enable efficient calibration of a sensing system of an autonomous vehicle (AV). In one implementation, disclosed is a method and a system to perform the method, the system including the sensing system configured to collect sensing data and a data processing system, operatively coupled to the sensing system. The data processing system is configured to identify reference point(s) in an environment of the AV, determine multiple estimated locations of the reference point(s), and adjust parameters of the sensing system based on a loss function representative of differences of the estimated locations.

16 Claims, 6 Drawing Sheets

CALIBRATION OF SENSORS IN AUTONOMOUS VEHICLE APPLICATIONS

TECHNICAL FIELD

The instant specification generally relates to autonomous vehicles. More specifically, the instant specification relates to improving autonomous driving systems and components with calibration of various sensors of autonomous vehicles using natural scenes as well as motion of the autonomous vehicle and various objects encountered in driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
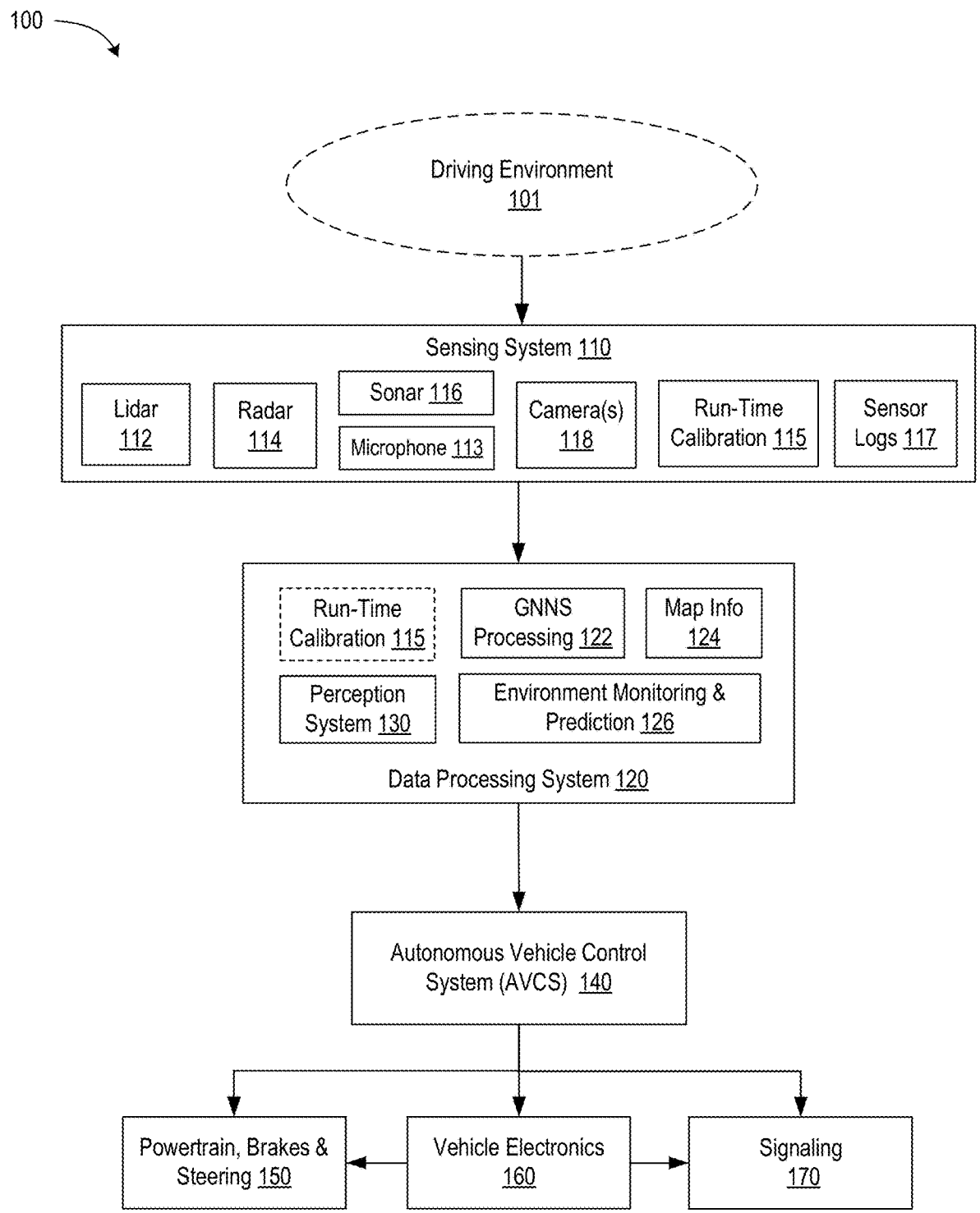
FIG. 1 is a diagram illustrating components of an example autonomous vehicle (AV) capable of a calibration of one or more sensors of the AV using reference features identified in actual driving environments of the AV, in accordance with some implementations of the present disclosure.

In one implementation, disclosed is a system that includes a plurality of sensors of a sensing system of an autonomous vehicle (AV), the sensing system configured to collect sensing data during operation of the AV. The disclosed system further includes a data processing system, operatively coupled to the sensing system, the data processing system configured to identify, based on the collected sensing data, a first reference point associated with a first object in an environment of the AV; determine i) a first estimated location of the first reference point using a sensing data obtained by a first subset of the plurality of sensors and ii) a second estimated location of the first reference point using a sensing data obtained by a second subset of the plurality of sensors; and adjust parameters of one or more of the plurality of sensors based on a loss function representative of a difference of the first estimated location and the second estimated location.

In another implementation, disclosed is a first sensor and a second sensor of a sensing system of an AV, the sensing system configured to collect sensing data during operation of the AV. The disclosed system further includes a data processing system, operatively coupled to the sensing system, the data processing system configured to identify, based on the collected sensing data, a plurality of reference points associated with an environment of the AV, determine i) first estimated locations of each of the plurality of reference points using the sensing data collected by a first sensor and ii) second estimated locations of each of the plurality of reference points using the sensing data collected by a second sensor; and adjust parameters of at least one of the first sensor or the second sensor based on a loss function representative of a difference of the first estimated locations and the second estimated locations.

In another implementation, disclosed is a method that includes collecting sensing data, using a plurality of sensors of a sensing system of an AV; identifying, based on the collected sensing data, a first reference point associated with a first object in an environment of the AV; determining i) a first estimated location of the first reference point using a sensing data obtained by a first subset of the plurality of sensors and ii) a second estimated location of the first reference point using a sensing data obtained by a second subset of the plurality of sensors; and adjusting parameters of one or more of the plurality of sensors based on a loss function representative of a difference of the first estimated location and the second estimated location.

DETAILED DESCRIPTION

An autonomous vehicle can employ a number of sensors to facilitate detection of objects in the outside environment and determine a motion performed by such objects. The sensors typically include radio detection and ranging (radar) sensors, light detection and ranging (lidar) sensors, multiple digital cameras, sonars, positional sensors, and the like. Timely and precise detection of objects and their motion depends on accurate calibration of the sensors and maintaining calibration of the sensors throughout autonomous driving missions. Different types of sensors provide different and complementary benefits. For example, radars and lidar emit electromagnetic signals (radio signals or optical signals) that reflect from the objects and determine distances to the objects (e.g., from the time of flight of the signals) and velocities of the objects (e.g., from the Doppler shift of the frequencies of the signals). Radars and lidars can cover an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars and radars have different advantages. Lidars, by virtue of a significantly smaller wavelength, have a higher spatial resolution, which allows obtaining many closely-spaced return points from the same object. Lidars, however, have expensive high-quality optical components that have to be carefully manufactured and maintained. Additionally, optical signals of lidars attenuate at distances of the order of several hundred meters and work less effectively in poor weather conditions.

Radar sensors are inexpensive, require less maintenance than lidar sensors, have a large working range of distances, and possess a good tolerance of adverse environmental conditions, e.g., foggy, snowy, or misty driving conditions. Because of the low cost and complexity of radar sensors, multiple radar devices can be mounted on a vehicle and positioned at locations that collectively provide a wide field of view. Precision of radar returns, however, can be limited by a relatively long wavelength, as compared with the wavelength of light used in the optical lidar technology. Both radars and lidars are capable of providing a three dimensional view of the environment.

A camera (e.g., a photographic or video camera) allows a high resolution of objects at both shorter and longer distances, but provides a projection of a three-dimensional space onto a two-dimensional image plane (or some other non-planar surface). As a result, the resolution of lateral coordinates of objects can be different (e.g., higher) than the resolution of radial distances to the same objects (with radial distances being estimated from, e.g., a focal length of the camera that provides the maximum sharpness of the images of objects).

With various sensors providing different benefits, an autonomous vehicle sensing system typically deploys sensors of multiple types, leveraging each sensor's advantages to obtain a more complete picture of the outside environment. For example, a lidar can accurately determine a distance to an object and the radial velocity of the object whereas a camera, upon acquiring a time series of images, can determine the lateral velocity of the object. Reliability of object tracking, however, depends on the accuracy of matching objects in the images and other data obtained by different sensors. For example, an unrecognized (and, therefore, uncorrected) error in a camera orientation of 1° results in an error of about 2 meters at a distance of 100 meters and can result in an incorrect lidar-camera association interpreting different objects as the same object or vice versa. A misalignment of a camera orientation can occur due to manufacturing (e.g., installation) tolerances, as a result of shaking due to road bumps, uneven heating of different components of the autonomous vehicle and the camera, and so on. The focal distance of the lens of a camera can be affected by elements of the environment precipitating on the camera or by wear of the optical and mechanical components of the camera. Correcting for various errors in alignment and inaccuracies of sensor data is referred to herein as calibration. Currently, calibration of various sensors of an autonomous vehicle can be performed during the vehicle's off time, and may require special facilities, sophisticated calibration targets depicting a special scenery, and various expensive procedures performed by fleet engineers. Such procedures, however, are complex and not efficient to be performed after each driving mission and, moreover, do not insure against a loss of calibration during performance of a particular mission.

Aspects and implementations of the present disclosure address these and other shortcomings of the existing calibration technology by enabling methods and systems that perform run-time calibration and recalibration of various sensors of an autonomous vehicle using native scenery encountered during actual driving missions. Run-time calibration can include identifying features of outside objects (herein referred to as reference points) that are sufficiently prominent to be detectable by various sensors, such as multiple cameras, lidar(s), radar(s), and so on. Coordinates of reference points can be determined based on data from multiple sensors, e.g., by a lidar sensor, a front-facing camera, a surround-view camera, and so on. The coordinates determined by different sensors can differ from each other. Calibration of the sensors can be performed by optimizing various sensor parameters (such as directions of view, focal lengths, precise locations of the sensors on the AV, etc.) in a way that minimizes errors in coordinates of reference points as determined by different sensors. Reference points can be stationary, e.g., a road sign, a parked vehicle, a trunk of a tree, a feature of a building, bridge, or any other structure. In some instances, reference points can be moving, such as a vehicle or a pedestrian, and the run-time calibration can further include tracking a motion of the moving reference point relative to the autonomous vehicle over a period of time preceding and concurrent with the collection of the calibration data. Advantages of the described implementations include fast, accurate, and inexpensive calibration of sensors during actual driving missions using native scenes (actual objects) encountered in the driving environments. Described implementations can operate in situations of a large parallax of distributed sensors mounted at different locations of the autonomous vehicle.

FIG. 1 is a diagram illustrating components of an example autonomous vehicle (AV) 100 capable of a calibration of one or more sensors of the AV using reference features identified in actual driving environments of the AV, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input). Although, for brevity and conciseness, various systems and methods are described in conjunction with autonomous vehicles, similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. The disclosed techniques can be used in Level 3 driving assistance systems capable of autonomous driving under limited (e.g., highway) conditions. Likewise, the disclosed techniques can be used in vehicles that use Level 4 self-driving systems that operate autonomously under most regular driving situations and require only occasional attention of the human operator. In all such systems, accurate calibration of various sensors of the vehicle can be performed automatically without a driver input or control (e.g., while the vehicle is in motion) and result in improved reliability of object detection and tracking and the overall safety of autonomous, semi-autonomous, and other driver assistance systems.

A driving environment 101 can include any objects (animate or inanimate) located outside the AV, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion (e.g., Level 5 and Level 4 systems), conditional autonomous motion (e.g., Level 3 systems), and/or motion of vehicles equipped with driver assistance technology (e.g., Level 2 systems) can occur. Additionally, "driving environment" can include any possible flying environment of an aircraft (or spacecraft) or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, lidar 112 and/or radar 114 can use heterodyne detection for velocity determination. In some implementations, the functionality of a ToF and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on AV 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. Some cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, for active sound probing of the driving environment 101, e.g., ultrasonic sonars, and one or more microphones 113 for passive listening to the sounds of the driving environment 101.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The sensing system 110 can include one or more modules to facilitate calibration of various sensors of the sensing system 110. For example, the sensing system 110 can include a run-time calibration module (RTC) 115 that can be used to perform calibration of one or more sensors of the sensing system 110. More specifically, in some implementations, RTC 115 can identify multiple features in the driving environment of the AV that are capable of serving as reference points for sensor calibration. For example, reference points can include a road sign, an edge of a moving or parked car, an axle of a vehicle, a corner of a bus stop overhang, a top/bottom of a beam supporting a bridge, or any other suitable object or a part of such an object. RTC 115 can also access parameters of the one or more sensors, e.g., direction of view (optical axis) of a camera or an angular speed of a scanning by a lidar transmitter/receiver, etc., and determine coordinates of the reference points relative to Earth or the AV, based on the accessed parameters. RTC 115 can perform such determinations for multiple sensors and compute differences between the coordinates determined based on data from different sensors. RTC 115 can then adjust the parameters of at least one sensor to optimize (e.g., minimize) the computed differences. In some implementations, optimization can be performed based on multiple sensing frames obtained by the sensors at different instances of time during tracking of the reference points.

In some implementations, the sensing system 110 may further include sensor logs 117 to store recorded sensor readings for various sensors, such as lidar 112, radar(s) 114, camera(s) 118, and the like. Sensor logs 117 may be used to perform sensor calibration during AV downtime, e.g., during time between driving missions. Sensor logs 117 may be indexed by the time of sensing, to allow correlating data from different sensors. Downtime calibration may be performed similarly to the run-time calibration described below. For example, coordinates of various reference points observed during autonomous driving missions can be stored in sensor logs 117 and processed between driving missions, e.g., by the data processing system 120 of the AV or by a server to which the sensor logs 117 may be uploaded.

The perception system 130 can further receive information from a Global Navigation Satellite System (GNSS) positioning subsystem (not shown in FIG. 1), which can include a GNNS transceiver (not shown), configured to obtain information about the position of the AV relative to Earth and its surroundings. The positioning subsystem can use the positioning data, e.g., GNNS and inertial measurement unit (IMU) data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data from sonar 116 or data from microphone 113 picking up emergency vehicle sirens), temperature sensor data, humidity sensor data, pressure sensor data, meteorological data (e.g., wind speed and direction, precipitation data), and the like. In some implementations, RTC 115 can perform run-time calibration of sensors of the sensing system 110 while taking output of the positioning subsystem (e.g., GNNS, IMU, etc.) as a ground truth. In other implementations, calibration performed by RTC 115 can also assume a possible error in the output of the positioning subsystem and compensate (e.g., using optimization techniques described below) for such errors together with errors in other sensors. For fast and more frequent calibrations, the first approach can be used whereas for more precise calibrations (e.g., performed less frequently), the second approach can be employed. Similarly, the first approach can be used for some calibration tasks (e.g., calibration of camera-lidar associations) while the second approach can be used for other calibration tasks (e.g., calibration of lidar-IMU associations).

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with RTC 115. For example, the environment monitoring and prediction component 126 can track relative motion of the AV and various objects (e.g., reference objects that are stationary or moving relative to Earth) and compensate for rolling shutter effects based on this tracking. For example, if the shutter time of a camera is T, and the relative velocity of the camera and the scenery being imaged is V, the data for regions of the scenery scanned near the end of the shutter time can be compensated by a shift VT relative to the regions scanned near the beginning of the shutter time. As depicted explicitly in FIG. 1, in some implementations, RTC 115 can be integrated into the data processing system 120.

The data generated by the perception system 130, the GNSS processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2:
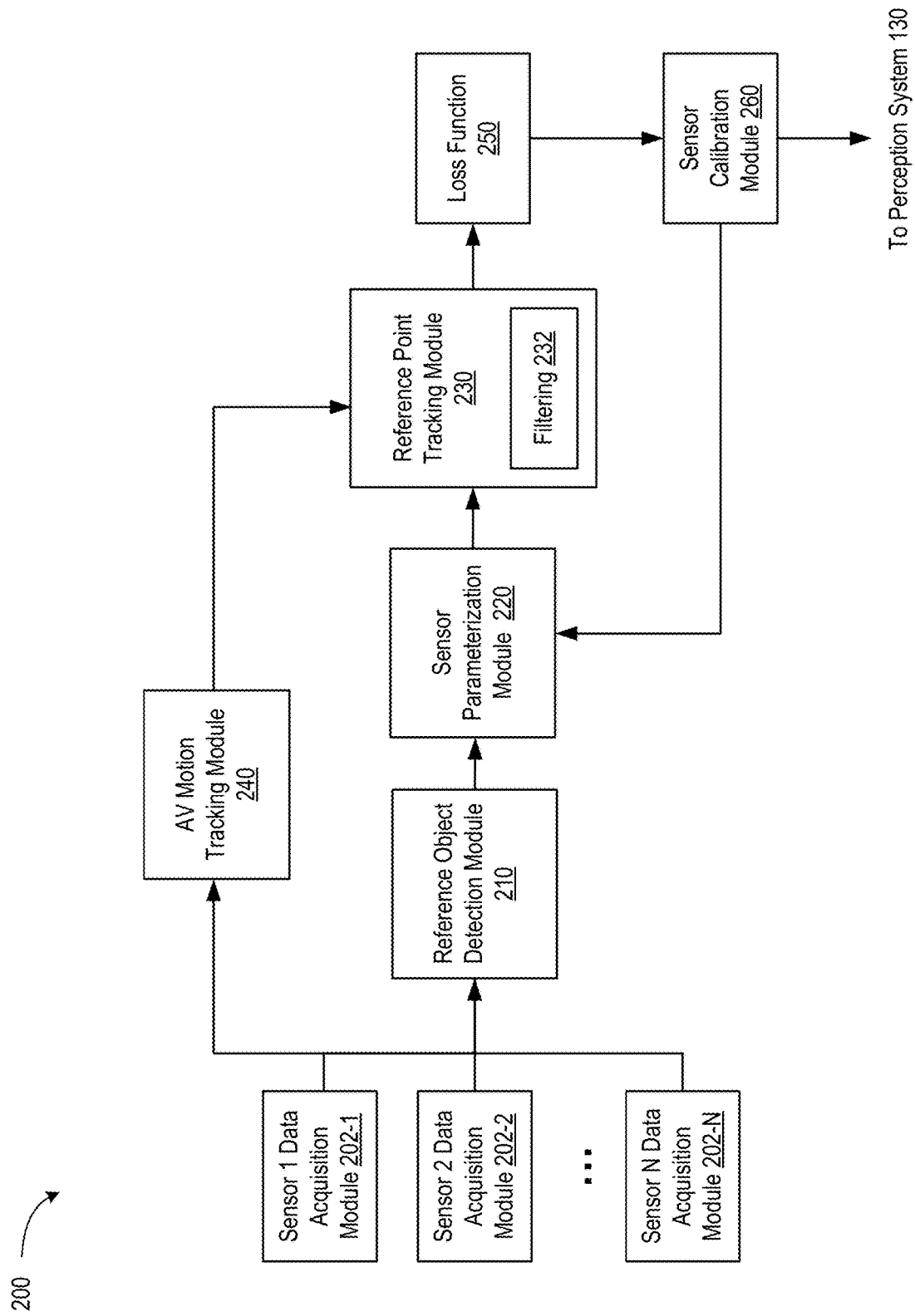
FIG. 2 is a diagram illustrating an example architecture of a calibration module of an AV capable of using reference features identified in actual driving environments, in accordance with some implementations of the present disclosure.

FIG. 2 is a diagram illustrating an example architecture 200 of a run-time calibration module of an AV capable of using reference features identified in actual driving environments, in accordance with some implementations of the present disclosure. Some modules and components depicted in FIG. 2 may be parts of RTC 115 of FIG. 1. Multiple sensors, enumerated with Greek index $\alpha=1 \ldots N$ can feed data that is used in run-time sensor calibration. Raw data from sensor $\alpha$ can be processed by a respective data acquisition module 202-$\alpha$, where data from sensor $\alpha$ can be filtered, denoised, upsampled, pixelated, downsampled, and the like. A reference object detection module 210 can receive the data outputted by the sensor acquisition modules 202-$\alpha$ and can identify one or more objects in the environment of the AV. In some implementations, reference object detection module 210 can be a part of perception system 120 of FIG. 1. Reference object detection module 210 can deploy a variety of methods and techniques to identify objects using the received data, including applying one or more clustering algorithms (e.g., iterative closest point algorithm or the like) to lidar returns, one or more object identification techniques (including but not limited to machine learning techniques) to camera images, and the like. Object identification techniques applied by reference object detection module 210 can include various feature detection algorithms, temporal feature matching, cross-camera feature matching, outlier rejection methods (e.g., random sample consensus or RANSAC) methods, and the like. Object identification techniques can further include matching identified objects to available pre-mapped features (e.g., map-based matching) and identifying matches to previous observations (loop-closure feature matching).

Reference object detection module 210 can select multiple reference points associated with the identified objects. The reference points can be selected based on visibility and distinctiveness, e.g. a top of a road sign, a tip of a post, a front bumper of a car, a center of a bounding box of an object, and so on. Selected reference points can have certain locations described by radius-vectors $\vec{R}_j$, with subscript $j=1 \ldots M$ enumerating selected reference points. The radius-vectors $\vec{R}_j$ may be defined with respect to Earth, in which case non-moving reference points (e.g., points associated with buildings, structures, road signs, etc.) are characterized by fixed $\vec{R}_j$. Alternatively or additionally, the radius-vectors can be defined relative to the AV (e.g., relative to any suitably chosen center of a coordinate system associated with the AV, e.g., its center of mass) and denoted herein with $\vec{r}_j$. In this case, radius-vectors $\vec{r}_j$ of some reference points can remain stationary if those reference points move in the same way as the AV (e.g., together with the traffic). The actual radius-vectors $\vec{r}_j$ (or $\vec{R}_j$) may be unknown to the reference object detection module 210 (or other modules of the sensing or perception systems of the AV). Instead, the radius-vectors $\vec{r}_j$ (or $\vec{R}_j$) can be inferred based on the data acquired by various sensors of the AV with a certain degree of accuracy that is determined by the intrinsic accuracy of the sensors, precision of calibration of the sensors, and so on. From the vantage point of sensor $\alpha$, reference point j can appear to be at a location $\vec{r}_{j(\alpha)}$ relative to sensor $\alpha$.

Sensor parameterization module 220 can keep track of various parameters of the sensors of the AV. The sensor parameters can include intrinsic as well as extrinsic parameters. Intrinsic parameters refer to sensor characteristics and settings that are internal to the sensor (e.g., focal distance of a camera, angular frequency of a lidar, etc.). Extrinsic parameters refer to interrelationships of sensors to outside bodies (e.g., orientation of the optical axis of the camera relative to the body of the AV, location of the lidar on the roof of the AV, etc.) Since various sensors are, generally, located at different points on the AV, the parameters of sensors can include locations of the sensors $\vec{r}_\alpha$ on the AV relative to the coordinate system associated with the AV; directions of view $\vec{n}_\alpha$ of the sensors (e.g., directions of the optical axes of the sensors), focal lengths $f_\alpha$ of the sensors, and so on. The parameters of sensors of the AV can be known from a manufacturing specification, from a previously performed calibration, or both. Based on the location of the sensors $\vec{r}_\alpha$, the direction of view $\vec{n}_\alpha$ of sensor $\alpha$, focal lengths $f_\alpha$ of sensor $\alpha$, etc. (provided by sensor parameterization module 220), reference point tracking module 230 can determine location $\vec{r}_{j(\alpha)}$ of reference point j relative to sensor $\alpha$. Lateral and radial components (relative to the direction of view $\vec{n}_\alpha$) of $\vec{r}_{j(\alpha)}$ can be determined from different procedures and, correspondingly, have different precisions. For example, lateral coordinates of a lidar return can be obtained from angular coordinates of the transmitted and/or received optical beams while the radial coordinate can be determined from the time-of-flight of the beams. The detected radius-vectors $\vec{r}_{j(\alpha)}$ can, therefore, depend on $\vec{n}_\alpha$ (as well as the focal distance $f_\alpha$).

To estimate the actual locations of reference points based on detected radius-vectors $\vec{r}_{j(\alpha)}$, reference object tracking module 230 can use locations of the sensors $\vec{r}_\alpha$ relative to the AV. Additionally, reference object tracking module 230 can receive data about motion of the AV (both the translational and the rotational motion of the AV) from an AV motion tracking module 240 and determine how locations of the sensors $\vec{r}_\alpha$ relative to the AV are transformed to the locations of the same sensors relative to Earth. Together with the observed locations $\vec{r}_{j(\alpha)}$, this enables reference object tracking module 230 to estimate actual locations $\vec{R}_j$ of various reference points relative to Earth. The estimates of the actual locations of various reference points can be obtained based on data from multiple sensors, e.g., from each sensor that is capable of observing the respective reference point, and can depend on the sensor whose data is used to obtain the estimates. For example a location of reference point j estimated from a first sensor (or a first group of sensors) can be $\vec{R}_{j(1)}$ and estimated from a second sensor (or a second group of sensors) can be $\vec{R}_{j(2)}$. In some implementations, object tracking module 230 may input the difference in the locations estimated by the two sensors (or groups of sensors) $\vec{R}_{j(1)}-\vec{R}_{j(2)}$ into a loss function 250 to minimize the observed error. In some implementations, the observed error, e.g., $\Omega_{12}=(\vec{R}_{j(1)}(t_1)-\vec{R}_{j(2)}(t_1))^2$ can be between locations estimated by two different sensors for the same imaging frame (indicated with time $t_1$). In some implementations, the loss function can be summed over multiple sensors (or groups of sensors), $\Omega=\Sigma_{\alpha\beta}\Omega_{\alpha\beta}$, e.g., over all sensors to which the reference point j is visible. In some implementations, the loss function may be defined for different frames, e.g., frames taken at time $t_1, t_2 \ldots$, etc. For example, the loss function can evaluate an error of two estimates of locations by the same sensor $\alpha$ (or groups of sensors) at different instances of time, e.g., $\Omega_{\alpha\alpha}(t_1, t_2)= (\vec{R}_{j(\alpha)}(t_1)-\vec{R}_{j(\alpha)}(t_2))^2$. In some implementations, the loss function can evaluate an error of two estimates of locations by different sensors $\alpha$ and $\beta$ (or groups of sensors) for different time frames, e.g., $\Omega_{\alpha\beta}(t_1, t_2) (\vec{R}_{j(\alpha)}(t_1)-\vec{R}_{j(\beta)}(t_2))^2$. In some implementations, the loss function can evaluate an aggregate error for multiple sensors and different frames, $\Omega(t_1, t_2)=\Sigma_{\alpha\beta}(\vec{R}_{j(\alpha)}(t_1)-\vec{R}_{j(\alpha)}(t_2))^2$. Numerous other loss functions 250 can be designed. In some implementations, loss function 250 can include constraints from IMU. For example, acceleration $\vec{a}$ (and angular acceleration $\vec{w}$) obtained by IMU can be integrated over time to obtain a change in the AV velocity and further integrated to obtain a change in the AV pose (position and orientation), and e.g., at time t and any other time t'. The difference (e.g., quadratic difference) in the change in the AV pose predicted from the IMU data (and/or wheel odometry data) and the change predicted based on data from other sensors can be included in the loss function 250. In some implementations, this loss function can also be used for intrinsic calibration of the IMU. Although for simplicity of the above illustrations the loss function is quadratic and isotropic (evaluating errors along all three spatial directions in the same way), various other non-quadratic and non-isotropic loss functions can be used. For example, a loss function can be selected that evaluates an error along the direction of the field of view $\vec{n}_\alpha$ of a given sensor differently than an error along the directions perpendicular to the direction of view $\vec{n}_\alpha$, e.g., as described below in connection with FIG. 4.

In some implementations, optimization can be performed with respect to both measured quantities (such as visible locations of reference points) as well as quantities that are unknown or partially known. For example, while the lateral coordinate of a reference object can be determined with substantial precision from a camera image, the radial coordinate of the same object can be ascertained from the same camera data with a lower accuracy. A distribution of likelihoods of such unknown or partially known quantities can be assumed and the optimization can be performed with respect to such distributions, e.g., parameterized with any suitable sets of parameters, including average value, variance, skewness, and the like, together with the optimization with respect to directly measured quantities. In some implementations, the distributions of unknown or partially known quantities can be non-parametric (e.g., non-Gaussian).

Sensor calibration module 260 can adjust parameters of various sensors in a way that optimizes (e.g., minimizes) the loss function 250. After optimization, sensor calibration module 260 updates the sensor parameterization module 220. Additionally, parameters of the sensors can be provided to perception system 130 of the AV, for more accurate interpretation of run-time sensing system data. As depicted with the respective errors in FIG. 2, operations of the sensor parametrization module 220 and reference point tracking module 230, computation of the loss function 250 and optimization of the sensor parameters by the sensor calibration module 260 can be repeated, e.g., at predetermined time intervals, periodically, or continuously.

Multiple variations of operations depicted in FIG. 2 can be performed. For example, reference point tracking can be improved by statistical filtering, e.g., using a Kalman filter algorithm, for more accurate identification of locations of reference points. The Kalman filter algorithm can track a relative motion of various reference points over multiple sensing frames. For example, based on the estimate of the location of the reference points for a current frame, the Kalman filter algorithm can predict locations of reference points for a subsequent frame, obtain new sensor data for the subsequent frame, update covariance matrices for the locations of reference points and for the measurement noise (e.g., Gaussian or non-Gaussian), and make a more accurate estimate of the current locations of reference points. This process can be repeated as long as the reference points are being tracked. In some implementations, tracking of objects can be performed using various statistical Monte Carlo techniques, including Bayesian inference. In such implementations, some of the quantities being tracked (e.g., locations and poses of various reference points and objects) may be filtered using particle filters (sequential Monte Carlo filters).

Figure 3:
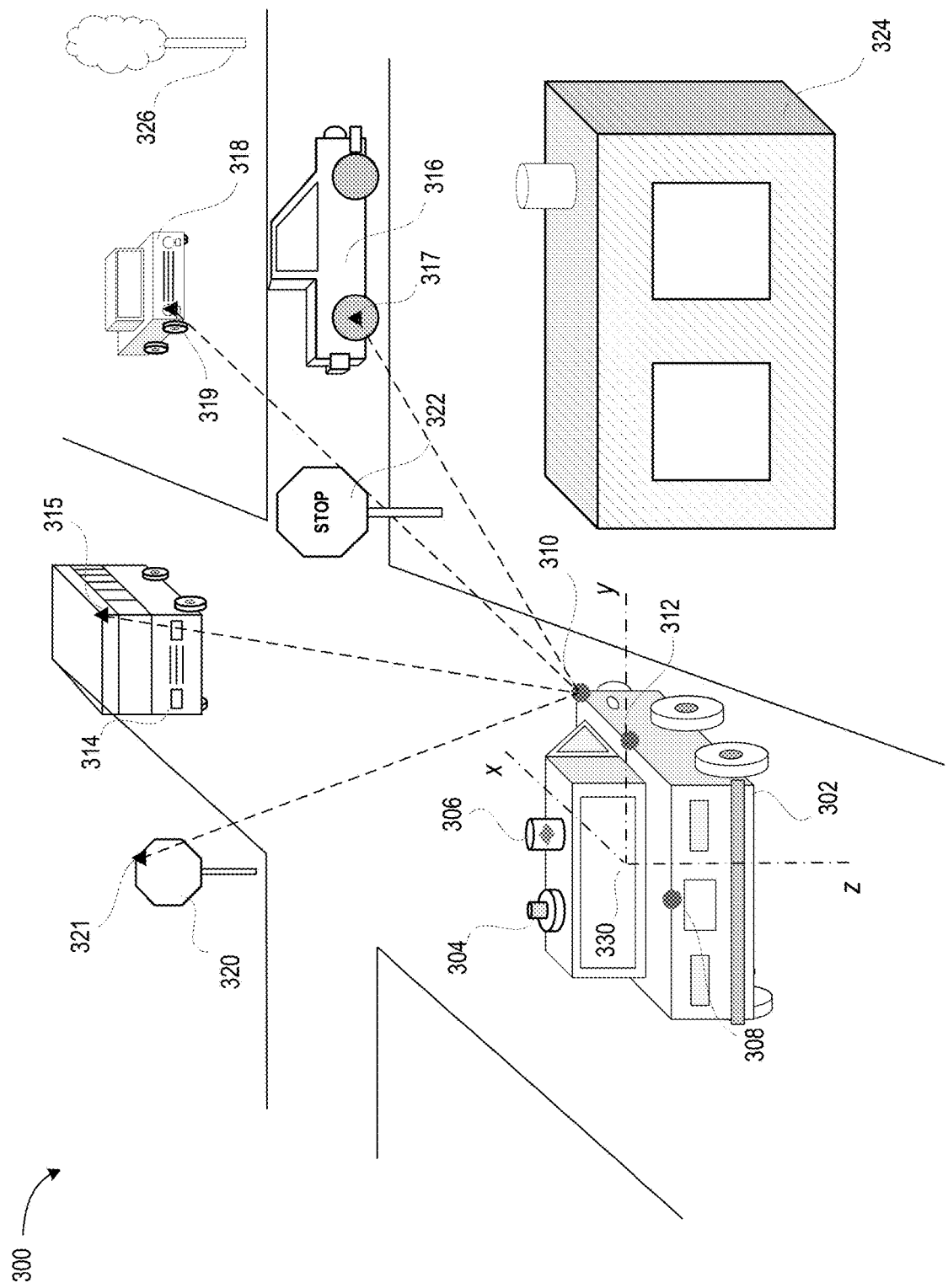
FIG. 3 is a schematic illustration of an example setup used for calibration of sensors of an autonomous vehicle, in accordance with some implementations of the present disclosure.

FIG. 3 is a schematic illustration of an example setup 300 used for run-time calibration of sensors of an autonomous vehicle, in accordance with some implementations of the present disclosure. FIG. 3 depicts an AV 302 equipped with N sensors, e.g., a lidar 304, panoramic (surround-view) camera 306, rear-facing camera 308, right-front camera 310, and right side camera 312. Other cameras, such as a front-facing camera, left side camera, left-front camera, etc., can also be mounted on AV 302 but not visible from a vantage point of FIG. 3. In various implementations, any other number of additional sensors can be placed on an AV, including rear-left (rear-right) cameras, additional lidars, radars, infrared cameras, and the like. Sensors of AV 302 can detect various objects in the driving environment, e.g., a bus 314, a moving truck 316, a parked car 318, multiple traffic signs 320, 322, etc., a building 324, a tree 326, and the like. Locations of various points and objects can be specified relative to a system of axes x, y, z whose center is associated with some point of AV 302, referred herein to as a center-of-mass (COM) 330 point for conciseness, although it should be understood that any other reference point can be used instead (located inside or even outside AV 302). Coordinates of sensors relative to COM 330 are denoted with $\vec{r}_\alpha$ with the subscript $\alpha=1, 2, \ldots N$ enumerating various sensors. Vector $\vec{r}_\alpha$ can indicate some specific element of a respective sensor, e.g., a receiving aperture of lidar 112, an objective lens of camera 118, and so on. Motion of AV 302 can be a combination of a translational motion of COM 330 with velocity $\vec{V}$ and a rotational motion around COM 330 with angular velocity $\vec{\omega}$. The components of the angular velocity along the coordinate axes are also referred to as roll angular velocity $\omega_x \equiv \omega_{roll}$, pitch angular velocity $\omega_y \equiv \omega_{pitch}$, and yaw angular velocity $\omega_z \equiv \omega_{yaw}$.

Reference object detection module 210 can identify M reference points (indicated with black triangles) specified with radius-vectors (herein also referred, for brevity, as locations) $\vec{r}_j$ relative to COM 330. A reference points can be any object, or a point of any object, that is observable by more than one sensor and associated with an identifiable feature of the object, e.g., as depicted, an edge point 315 of bus 314, an axle 317 of truck 316, a headlight 319 of car 318, a corner 321 of stop sign 320, and so on. Depicted with dashed lines are lines of sight from right-front camera 310 to various reference points 315, 317, 319, and 321.

Each sensor observes reference points (as well as any other objects) from a different vantage point relative to other sensors. For example, the difference $\vec{r}_\alpha - \vec{r}_\beta$ characterizes parallax between sensors $\alpha$ and $\beta$. The locations $\vec{r}_\alpha$, being defined relative to COM 330 of AV 302, can remain constant during motion of AV 302 (provided that shaking and outside impacts do not shift sensors). In the frame of sensor $\alpha$, reference point j is visible at a location defined by a vector $$\vec{r}_{j(\alpha)} = \vec{r}_j - \vec{r}_\alpha,$$

which is equal to the difference between the radius-vector of the reference point (in the COM frame) and the radius-vector of the corresponding sensor. Position of COM 330 and orientation of AV 302, generally, change with time. For example, over time interval $\Delta t = t_2 - t_1$ between two frames of sensor $\alpha$, taken at times $t_1$ and $t_2$, COM 330 can move by an amount characterized by a translation vector $\Delta \vec{R} = \vec{V}\Delta t$ and turn by an angle characterized by a rotation vector $\Delta \vec{\theta} = \vec{\omega}\Delta t$. The components of the rotation vector along the three coordinate vector represent roll angle $\theta_x$, pitch angle $\theta_y$, and yaw angle $\theta_z$, respectively. As a result of the translational motion and rotation of AV 302, the new positions of the sensors relative to Earth can be approximated as (vectors in the frame of Earth indicated with capital $\vec{R}$):

$$\vec{R}_\alpha(t_2) = \vec{R}_\alpha(t_1) + \vec{V}\Delta t + \vec{\omega} \times \vec{r}_\alpha \Delta t.$$

This approximation applies provided that a variation of the velocity $\vec{V}$ over the time interval $\Delta t$ is much less than the velocity $\vec{V}$ itself and the angle of rotation is small, $|\Delta \vec{\theta}| \ll 1$. Such conditions can be satisfied when two frames are obtained in quick succession so that the vehicle does not have time to change its position and orientation significantly.

In the instances of two frames separated by longer times, a more accurate transformation can be used for the new positions of the sensors relative to Earth, $$\vec{R}_\alpha(t_2) = \vec{R}_\alpha(t_1) + \Delta \vec{R} + \hat{T}_{\Delta \vec{\theta}}[\vec{r}_\alpha].$$

where $\hat{T}_{\Delta \vec{\theta}}$ is a matrix of rotations to an arbitrary angle $\Delta \vec{\theta}$ being applied to the vector location $\vec{r}_\alpha$ of sensor $\alpha$ relative to COM. Any form of the matrix of rotations can be used, expressed via any suitable parameters, such as roll angle $\theta_x$, pitch angle $\theta_y$, and yaw angle $\theta_z$, Euler's angles, or in any other suitable form, e.g. quaternion form, and so on.

Over the time interval $\Delta t$, some of the reference points can remain stationary (relative to Earth), such as reference point 319 associated with parked car 318 and reference point 321 associated with stop sign 320. Some other reference points could have moved in the meantime, e.g., reference point 317 associated with moving truck 316 and reference point 315 associated with moving bus 314. Denoting the average velocity of j-th reference point over the time interval $\Delta t$ as $\vec{V}_j$, the new locations of the reference points relative to Earth are displaced by $\Delta \vec{R}_j = \vec{V}_j \Delta t$:

$$\vec{R}_j(t_2) = \vec{R}_j(t_1) + \vec{V}_j \Delta t.$$

The velocities $\vec{V}_j$ may be determined from lidar data, radar data, tracking data, including data that has been subject to statistical (e.g. Kalman) filtering, and so on. In some implementations, the velocities $\vec{V}_j$ may themselves be determined during sensor calibration as additional fitting parameters.

The locations of the new reference points after time interval $\Delta t$ relative to the location of sensors can be obtained by subtracting the new locations of the reference points relative to Earth from the new position of the sensors relative to Earth, e.g., $$\vec{r}_{j(\alpha)}(t_2) = \vec{r}_{j(\alpha)}(t_1) + (\vec{V}_j - \vec{V})\Delta t - \vec{\omega} \times \vec{r}_\alpha \Delta t,$$

in the instances of small time intervals and rotation angles, and $$\vec{r}_{j(\alpha)}(t_2) = \vec{r}_{j(\alpha)}(t_1) + \Delta \vec{R}_j - \Delta \vec{R} - \hat{T}_{\Delta \vec{\theta}}[\vec{r}_{\neq 0}],$$

in the instances of arbitrary time intervals and rotations angles.

Figure 4:
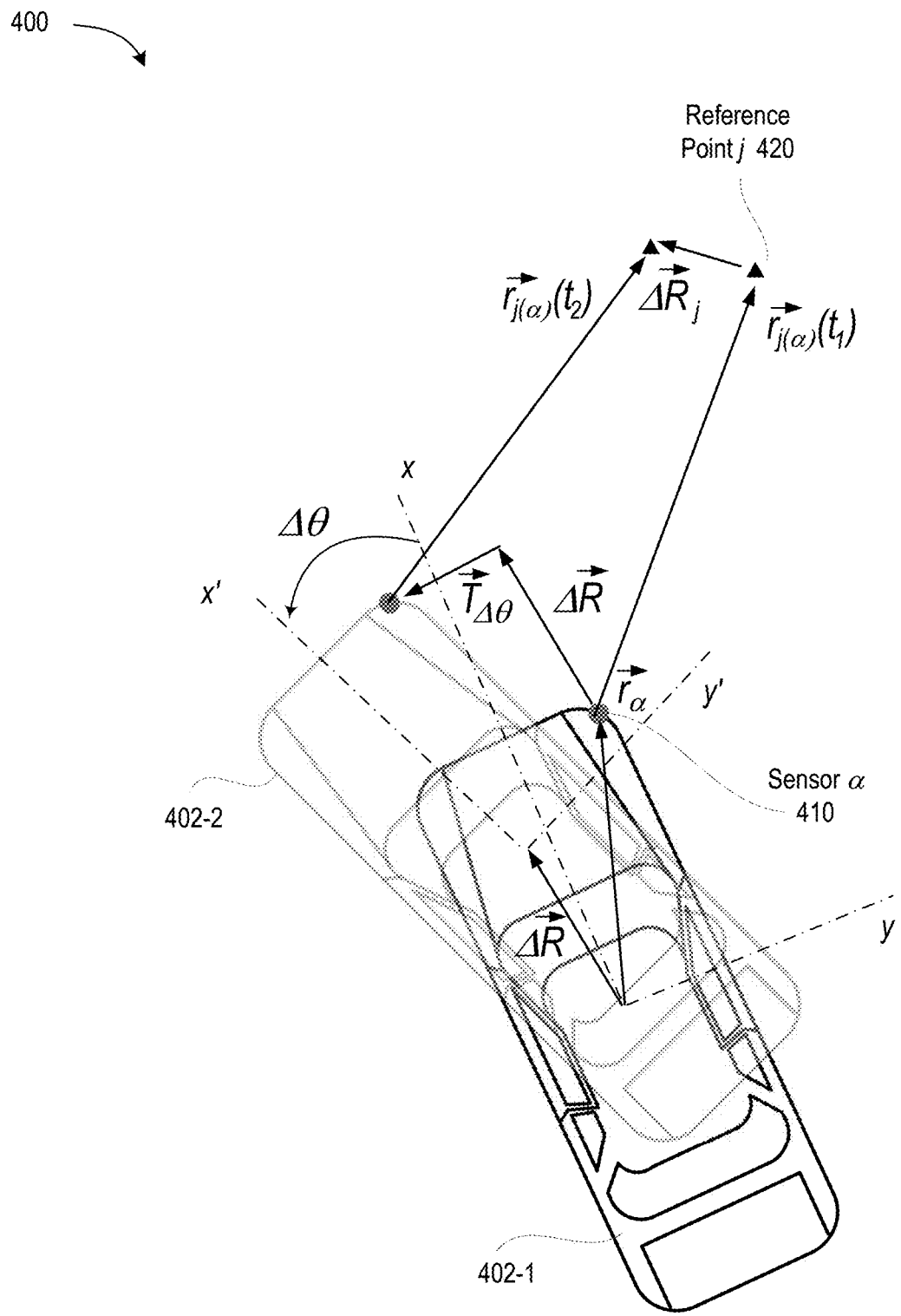
FIG. 4 is a schematic illustration of a change in a relative position of a sensor and a reference point during calibration of sensors of an autonomous vehicle, in accordance with some implementations of the present disclosure.

FIG. 4 is a schematic illustration 400 of a change in a relative position of a sensor and a reference point during run-time calibration of sensors of an autonomous vehicle, in accordance with some implementations of the present disclosure. FIG. 4 illustrates tracking of reference points in the driving environment using multiple sensors of the sensing system of the AV and construction of the loss function for sensor calibration. Multiple sensors can track (e.g., as a function of time) a distance and direction to a given reference point. The distance and direction can be adjusted in view of a known motion of the AV (e.g., from positioning data and sensing data relative to known stationary objects, e.g., roadway, road signs, etc.), including translational motion of the AV and rotational motion (turning) of the AV. The distance and the direction can be further adjusted in view of motion of the reference point(s). In some instances (stationary reference points) the apparent motion of the reference point(s) is due to the motion of the AV relative to the reference point. In some instances (e.g., moving reference points), the motion of the reference point(s) may itself be determined as part of optimization of the loss function with the velocity (and coordinates) of the reference point(s)

serving as additional optimization parameters. The distance and the direction to the reference point(s) can be further adjusted based on locations of different sensors on the AV, thus bringing the apparent (to different sensors) positions of the reference point(s) to a common reference frame. The differences in such adjusted locations of the reference point(s), as observed by multiple sensors, can then be evaluated with a loss function and minimized by adjusting various parameters of the sensors, including precise locations of the sensors on the AV, directions of view of the sensors, focal distances of the cameras, and the like.

More specifically, FIG. 4 depicts an AV having a first position 402-1 at time $t_1$ and performing a combination of a translational motion described by displacement vector $\Delta \vec{R}$ and a rotation to angle $\Delta\theta$ around a vertical axis to a second position 402-2 at time $t_2$. Although a planar projection of the motion of the AV is depicted, it should be understood that the AV can also perform motion in the other two planes, e.g. by moving uphill or downhill, changing pitch and yaw angle, and the like. As depicted, the coordinate axes x and y change their orientation to x' and y'. Sensor $\alpha$ 410 moves from its position at time $t_1$ to a new position at time $t_2$ in a combination of translation $\Delta \vec{R}$ of COM of the AV and rotational displacement $\vec{T}_{\Delta\vec{\theta}}[\vec{r}_\alpha]$ relative to COM. In the meantime, reference point j 420 can change its location by $\Delta \vec{R}_j$ (which can also be a due to translational motion of the object to which the reference point j 420 belongs or a rotational motion of the object, or a combination thereof). Although FIG. 4 depicts, for brevity and conciseness, a single sensor and a single reference point, similar geometric transformations relate locations of each of N sensors and each of M reference point for a maximum of N×M functions $\vec{r}_{j(\alpha)}(t)$, herein referred to as reference point-sensor associations. Some of the reference point-sensor associations may be absent, as some of the reference points may be occluded, from one or more sensors, by various intervening objects; some of the sensors may be located on the opposite side of the AV from some of the reference points, and so on.

Sensor $\alpha$ may track observed motion of reference point j over multiple frames, denoted with time stamps $t_k$, to obtain multiple values $\vec{r}_{j(\alpha)}(t_k)$. A particular sensor may be tracking a longitudinal distance to reference point j differently that lateral coordinates of reference point j. For example, if sensor $\alpha$ is a camera, sensor $\alpha$ may track lateral coordinates of reference point j based on the coordinates of pixel(s) in the image plane of the camera and may track longitudinal (e.g., radial) coordinates by determining a focal length of the camera that provides the sharpest image of the reference point. Accordingly, accuracy of the lateral and radial distance determination may be different (e.g., a lateral distance may be determined with a higher accuracy). Similarly, if sensor $\alpha$ is a lidar (or radar), sensor $\alpha$ may track lateral coordinates of reference point j based on the angular information obtained from lidar (or radar) transmitter/receiver and may track radial coordinates based on the time of flight of lidar (or radar) signals.

Direction of longitudinal sensing by sensor $\alpha$ is denoted herein by a unit vector $\vec{n}_\alpha$. For example, for a camera sensor, direction $\vec{n}_\alpha$ can be the direction of an optical axis of the sensor, which may be perpendicular to the imaging plane of the camera (e.g., a plane of photodetectors of the camera). Correspondingly, sensor $\alpha$ can be separately keeping track of the longitudinal motion of reference point j, $[\vec{r}_{j(\alpha)}(t)]_\| = \vec{r}_{j(\alpha)}(t) \cdot \vec{n}_\alpha$:

$[\vec{r}_{j(\alpha)}(t_2)]_\| = [\vec{r}_{j(\alpha)}(t_1)]_\| + \Delta\vec{R}_j \cdot \vec{n}_\alpha - \Delta\vec{R} \cdot \vec{n}_\alpha - T_{\Delta\vec{\theta}}[\vec{r}_\alpha] \cdot \vec{n}_\alpha$, and the lateral motion of reference point j, $[\vec{r}_{j(\alpha)}(t)]_\perp = \vec{r}_{j(\alpha)}(t) - \vec{n}_\alpha(\vec{r}_{j(\alpha)}(t) \cdot \vec{n}_\alpha)$, or in a different but substantially similar (rotated) representation, $[\vec{r}_{j(\alpha)}(t)]_\perp = \vec{r}_{j(\alpha)}(t) \times \vec{n}_\alpha$:

$[\vec{r}_{j(\alpha)}(t_2)]_\perp = [\vec{r}_{j(\alpha)}(t_1)]_\perp + \Delta\vec{R}_j \times \vec{n}_\alpha - \Delta\vec{R} \times \vec{n}_\alpha - T_{\Delta\vec{\theta}}[\vec{r}_\alpha] \times \vec{n}_\alpha$.

For reference points that are not moving relative to Earth, $\Delta\vec{R}_j = 0$.

Radial $[\vec{r}_{j(\alpha)}(t)]_\|$ and lateral $[\vec{r}_{j(\alpha)}(t)]_\perp$ coordinates can be identified for individual frames by reference object detection module 210 and tracked across multiple frames $t_k$ by reference object tracking module 220. Sensor parameterization module 230 may assign values to different parameters of sensors, e.g., based on manufacturing specification or an outcome of the last calibration. The parameters can include the positions $\vec{r}_\alpha$ of the sensors, the direction of the optical axes of the sensors $\vec{n}_\alpha$, focal lengths of the sensors $f_\alpha$, optical aberration, and the like. Sensor calibration module 260 may optimize at least some these parameters using a loss function 240 suitably chosen to characterize a mismatch between expected (based on the assigned parameter values) and observed coordinates of various reference points. In one non-limiting example, the loss function for sensor $\alpha$ is a quadratic function that evaluates errors in cross-frame predictions for radial and lateral coordinates, e.g., $\Omega_\alpha = [\Omega_\alpha]_\| + [\Omega_\alpha]_\perp$, where $[\Omega_\alpha]_\|$ is a weighted (with weight $W_{\alpha\|}$) squared difference between a measured radial coordinate of reference point $[\vec{r}_{j(\alpha)}(t_2)]_\|$ and the expected radial coordinate, as determined based on the previously measured radial coordinate of the same point $[\vec{r}_{j(\alpha)}(t_1)]_\|$. A sum may be taken over some or all reference points j (e.g., reference points that are visible to detector $\alpha$):

$[\Omega_\alpha]_\| =$ $\sum_{j=1}^{M} W_{\alpha\|} \cdot \left( [\vec{r}_{j(\alpha)}(t_2)]_\| - [\vec{r}_{j(\alpha)}(t_1)]_\| - \Delta\vec{R}_j \cdot \vec{n}_\alpha + \Delta\vec{R} \cdot \vec{n}_\alpha + \vec{T}_{\Delta\vec{\theta}}[\vec{r}_\alpha] \cdot \vec{n}_\alpha \right)^2$;

similarly, $[\Omega_\alpha]_\perp$ is a weighted (with weight $W_{\alpha\perp}$) squared difference between measured lateral coordinates of the reference point $[\vec{r}_{j(\alpha)}(t_2)]_\perp$ and the expected lateral coordinates, as determined based on the previously measured radial coordinates of the same point $[\vec{r}_{j(\alpha)}(t_1)]_\perp$, summed over some or all (visible) reference points:

$[\Omega_\alpha]_\perp =$ $\sum_{j=1}^{M} W_{\alpha\perp} \cdot \left( [\vec{r}_{j(\alpha)}(t_2)]_\perp - [\vec{r}_{j(\alpha)}(t_1)]_\perp - \Delta\vec{R}_j \times \vec{n}_\alpha + \Delta\vec{R} \times \vec{n}_\alpha - \vec{T}_{\Delta\vec{\theta}}[\vec{r}_\alpha] \times \vec{n}_\alpha \right)^2$.

In some implementations, each loss function $\Omega_\alpha$ is minimized independently of other loss functions, with parameters of sensor $\alpha$ determined based on minimization of $\Omega_\alpha$. In some implementations, minimization is performed for an aggregate loss function $$\Omega = \sum_{\alpha=1}^{N} \Omega_\alpha.$$

In the aggregate loss function, optimization can be performed with respect to at least some or all of the following parameters: direction of view $\vec{n}_\alpha$ of sensor $\alpha$, location $\vec{r}_\alpha$ of sensor $\alpha$ (relative to COM 330 of the AV), displacement $\Delta\vec{R}_j$ of reference point j (relative to Earth), displacement $\Delta\vec{R}$ of the AV (relative to Earth), a focal length of a camera sensor, and so on. In some implementations, the displacement $\Delta\vec{R}_j$ of reference point j and displacement $\Delta\vec{R}$ of the AV may be determined based on data obtained from multiple sensors. For example, a lidar sensor may be capable of identifying coordinates of each reference point for different sensing frames. In some instances, the motion of the AV can be determined by first identifying (e.g., by perception system 130) those reference points that remain stationary relative to Earth. For example, such a determination can be performed by identifying multiple lidar return points that have the same velocity relative to the AV; such points can be associated with objects that are stationary with respect to Earth (buildings, structures, curbs, fences, bridges, traffic signs, etc.). Similarly, locations of various reference objects can be determined from radar data. As another example, a camera can determine locations of the reference points based on a two-dimensional pixel image of a portion of the driving environment and the focal distance that provides a sharp image of the respective reference points. In some implementations, locations of reference objects may be average, e.g., weighted average, locations obtained by multiple sensors. The weighted average locations can be computed using empirically selected weights, which can be determined by field-testing.

Although the loss function used as an example above is a squared error loss function, any other suitable loss function can be used instead, including but not limited to absolute error loss function, Huber loss function, log-cos h loss function, and the like. Parameters of the loss function, e.g., weights $W_{\alpha\|}$ and $W_{\alpha\perp}$, can be selected empirically. In some implementations, the weights (or other parameters) can be fixed. In some implementations, higher weights can be assigned to sensor (or sensors) that are being calibrated and lower weights assigned to other sensors. In some instances, multiple (or all) sensors can be calibrated at once. Although in the above example, weights for the lateral distance errors are the same (e.g., $W_{\alpha\perp}$), in some implementations, errors in the vertical distance can be weighted differently than errors in the horizontal distance. Numerous other loss evaluations techniques and schemes can be used to optimize a suitably chosen loss function and determine sensor calibration parameters. Similarly, in those instances where a particular subset of sensors (e.g., one or more cameras and a lidar) are used, during perception processing of the AV, together, such a subset of sensors can be weighed differently than other sensors. For example, weights $W_{\alpha\|}$ and $W_{\alpha\perp}$ for the sensors of the subset can be larger than the weights for other sensors). In some implementations, calibration can be performed until a target accuracy is achieved, e.g., when the sum of the loss functions (e.g., for all or a subset of sensors) is within a certain threshold. The threshold can be specific for a particular type of the sensor being calibrated, the loss function being used, and may be determined based on empirical testing. For example, it may be empirically determined that a square error loss function needs to be below a first threshold for a direction of view of a camera to be determined within a 0.5-degree accuracy and to be below a second threshold for a higher 0.1-degree accuracy.

The described techniques enable calibration of sensors that, individually, can be weakly sensitive to the changing natural scene. For example, a side-facing camera mounted on the AV can have a limited field of view and can detect objects (e.g., oncoming traffic) that move too quickly to allow an accurate calibration for small extrinsic errors in the camera positioning. By optimizing concurrently parameters of a combination of sensors, including sensors that observe the same natural scene from different vantage points and using various feature matching techniques described above, RTC 115 can reliably and efficiently calibrate sensors that otherwise (without data available from other sensors) would not be amenable to accurate calibration.

Figure 5:
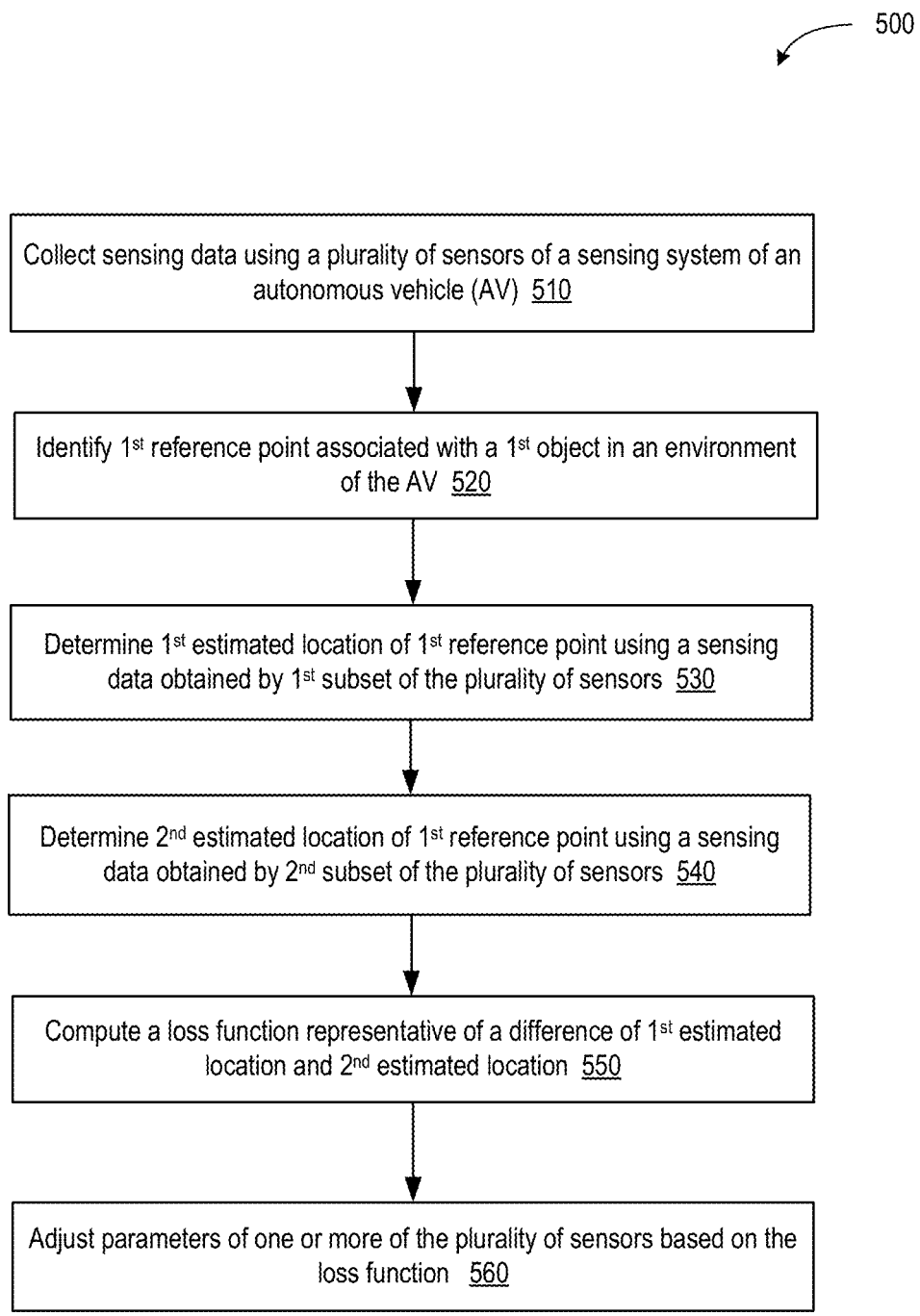
FIG. 5 illustrates an example method of calibration of sensors of an autonomous vehicle, in accordance with some implementations of the present disclosure.

FIG. 5 illustrates an example method 500 of run-time calibration of sensors of an autonomous vehicle, in accordance with some implementations of the present disclosure. A processing device, having one or more processing units (e.g., central processing units, CPUs, and/or graphics processing units, GPUs) communicatively coupled to memory devices can perform method 500 and/or each of its individual functions, routines, subroutines, or operations. In some implementations, a low-resource microcontroller can perform method 500 or any portion of its operations. The processing device executing method 500 can perform instructions issued by various components of the sensing system 110 or data processing system 120 of FIG. 1, e.g., RTC 115. Method 500 can be directed to systems and components of an autonomous driving vehicle, such as autonomous vehicle 100 of FIG. 1. Method 500 can be used to improve performance of the sensing system 110, data processing system 120, and/or the autonomous vehicle control system 140. In certain implementations, a single processing thread can perform method 500. Alternatively, two or more processing threads can perform method 500, each thread executing one or more individual functions, routines, subroutines, or operations of the methods. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Various operations of method 500 can be performed in a different order compared with the order shown in FIG. 5. Some operations of method 500 can be performed concurrently with other operations. Some operations can be optional.

Method 500 can use real-time sensing data obtained by scanning a driving environment of the AV using a plurality of sensors of the sensing system of the AV. The sensing system can include one or more lidar sensors, radar sensors, and/or one or more camera sensors. Camera sensors can include panoramic (surround-view) cameras, partially panoramic cameras, high-definition (high-resolution) cameras, close-view cameras, cameras having a fixed field of view (relative to the AV), cameras having a dynamic (adjustable) field of view, cameras having a fixed or adjustable focal distance, cameras having a fixed or adjustable numerical aperture, and any other suitable cameras. At block 510, method 500 can include collecting sensing data during operation of the AV. Operation of the AV can include starting the AV, driving the AV (e.g., on streets and highways, rural roads, etc.), stopping the AV, parking the AV, operating the AV in an idling mode, and so on. Collected sensing data can include lidar return points, each return point associated with a distance to a reflecting surface, a direction from the lidar transmitter/receiver towards the reflecting surface, a velocity (e.g., radial velocity) of the reflecting surface, a strength of the reflected signal, and the like. Collected sensing data can further include camera images. Each camera image can include a two-dimensional projection of a portion of the driving environment, obtained using an optical system having a particular focal distance and pointing at a particular direction (direction of view), which can be a direction of the optical axis of the camera's optical system. Camera images can carry information about instantaneous locations of various objects in the driving environment. Camera images can have different accuracy of mapping objects with respect to different directions, e.g., resolution of objects' locations can be greater in the lateral direction (relative to the direction of view) than in the radial direction. The data obtained by the sensing system of the AV can be provided to the data processing system, e.g., to the run-time calibration module (RTC 115).

At block 520, method 500 can continue with the RTC identifying, based on the collected sensing data, a first reference point associated with a first object in an environment of the AV. The first reference point can be identified by multiple sensors, e.g., a lidar sensor, a panoramic camera, a frontal view camera, a side view camera, and the like. At block 530, the RTC can use determine a first estimated location, e.g., $\vec{R}_{1(1)}$, of the first reference point using sensing data obtained by a first subset of the plurality of sensors. In some implementations, the first subset of sensors can include one sensor (e.g., a lidar sensor). In some implementations, the first subset of sensors can include multiple sensors (e.g., a lidar sensor and a frontal view camera). At block 540, the RTC can identify a second estimated location of the first reference point, e.g., $\vec{R}_{1(2)}$, using a sensing data obtained by a second subset of the plurality of sensors. The second subset can similarly include a single sensor (e.g., a side view camera) or multiple sensors (e.g., a side view camera and a rear view camera). In some implementations, the first subset and the second subset of the plurality of sensors are overlapping (sharing at least some or sensors). Due to errors in calibration of some sensors or changing environmental conditions, the two estimated locations can be different, $\vec{R}_{1(1)} \neq \vec{R}_{1(2)}$, even though they are related to the same (first) reference point.

At block 550, the RTC can compute a loss function representative of the difference of the first estimated location and the second estimated location, $\vec{R}_{1(1)} \neq \vec{R}_{1(2)}$. In some implementations, the loss function can be a square error loss function, a mean absolute error function, a mean bias error function, a Huber function, a cross entropy function, or a Kullback-Leibler function. In some implementations, the loss function weighs differently a radial part of the difference of the first estimated location and the second estimated location, e.g., $(\vec{R}_{1(1)} - \vec{R}_{1(2)})_\parallel$ and a lateral part $(\vec{R}_{1(1)} - \vec{R}_{1(2)})_\perp$ of the difference of the first estimated location and the second estimated location. At block 560, method 500 can continue with the RTC adjusting parameters of one or more of the plurality of sensors based on the computed loss function. The parameters of one or more of the plurality of sensors being adjusted can include a location of a sensor on the AV, a direction of view of a camera sensor, a focal length of the camera sensor, the direction of view associated with an optical axis of the camera sensor, and the like. The parameters can be adjusted to reduce the loss function and, therefore, the difference between the first estimated location and the second estimated location.

In some implementations, multiple reference points can be used to adjust parameters of the sensing system. For example, the RTC can identify a second reference point associated with a second object in the environment of the AV and determine a third estimated location, e.g. $\vec{R}_{2(1)}$, of the second reference point using the sensing data obtained by the first subset of the plurality of sensors (or a different, third subset of the plurality of sensors). The RTC can further determine a fourth estimated location of the second reference point, e.g. $\vec{R}_{2(2)}$, using the sensing data obtained by the second subset of the plurality of sensors (or a different, fourth subset of the plurality of sensors). The RTC can further apply the loss function to the difference between the third estimated location and the fourth estimated location, $\vec{R}_{2(1)} - \vec{R}_{2(2)}$, and perform the optimization of the loss function to adjust one or more parameters of at least some of the sensors. In some implementations, the optimization based on the second reference point can be performed after the optimization based on the first reference point is completed. In some implementations, the optimization based on the second reference point can be performed concurrently and independently of the optimization based on the first reference point. In some implementations, the optimization based on the second reference point can be performed together with the optimization based on the first reference point, e.g., with the loss functions for the two reference points aggregated and optimized together (batch optimization). Any number of reference points can be processed as described above, e.g., one after another or aggregated together.

Figure 6:
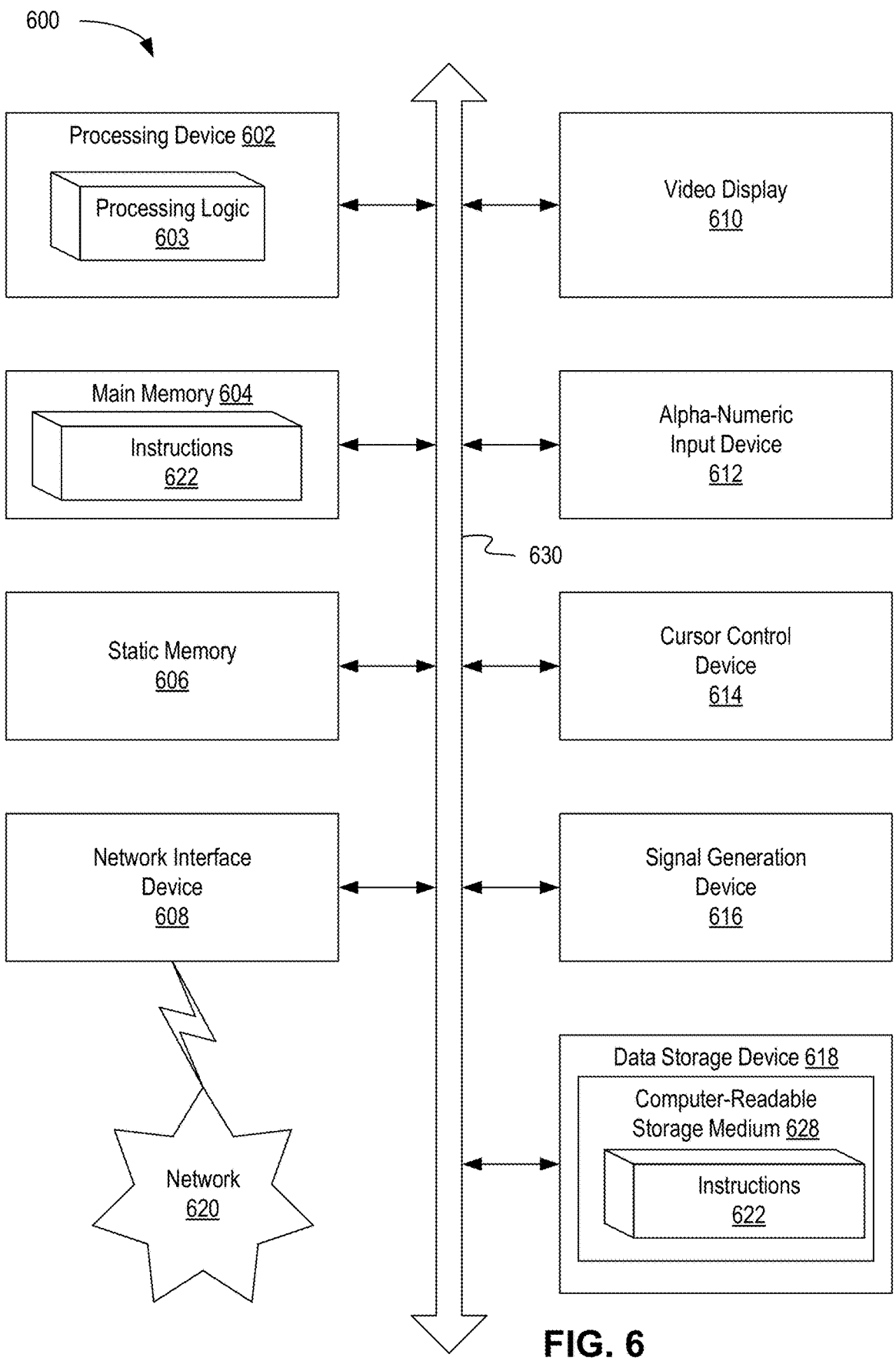
FIG. 6 depicts a block diagram of an example computer device capable of enabling run-time calibration of sensors of an autonomous vehicle, in accordance with some implementations of the present disclosure.

FIG. 6 depicts a block diagram of an example computer device 600 capable of enabling run-time calibration of sensors of an autonomous vehicle, in accordance with some implementations of the present disclosure. Example computer device 600 can be connected to other computer devices in a LAN, an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 can be configured to execute instructions performing method 500 of run-time calibration of sensors of an autonomous vehicle.

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions performing method 500 of run-time calibration of sensors of an autonomous vehicle.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a plurality of sensors of a sensing system of an autonomous vehicle (AV), the sensing system configured to collect sensing data during operation of the AV; and a data processing system, operatively coupled to the sensing system, the data processing system configured to:
- based on the collected sensing data, identify a first reference point associated with a first object in an environment of the AV;
- determine i) a first estimated location of the first reference point using a first sensing data obtained by a first subset of the plurality of sensors and ii) a second estimated location of the first reference point using a second sensing data obtained by a second subset of the plurality of sensors; and
- adjust one or more parameters of at least one sensor of the plurality of sensors based on a loss function that weights differently a radial difference of the first estimated location and the second estimated location and a lateral difference of the first estimated location and the second estimated location.

2. The system of claim 1, wherein the data processing system is further configured to:
- identify a second reference point associated with a second object in the environment of the AV; and
- determine i) a third estimated location of the second reference point using the first sensing data and ii) a fourth estimated location of the second reference point using the second sensing data; and
- wherein the loss function is further representative of a difference between the third estimated location and the fourth estimated location.

3. The system of claim 1, wherein the plurality of sensors comprise one or more of a camera sensor, a lidar sensor, or a radar sensor.

4. The system of claim 1, wherein the one or more adjusted parameters comprise a direction of view of a camera sensor.

5. The system of claim 4, wherein the direction of view is associated with an optical axis of the camera sensor.

6. The system of claim 1, wherein the loss function comprises at least one of a square error loss function, a mean absolute error function, a Huber function, a cross entropy function, or a Kullback-Leibler function.

7. The system of claim 1, wherein the one or more parameters are adjusted during a down-time of the AV.

8. A system comprising:
- a sensing system configured to collect sensing data during operation of an autonomous vehicle (AV), the sensing system comprising a first sensor and a second sensor; and
- a data processing system, operatively coupled to the sensing system, the data processing system configured to:
  - based on the collected sensing data, identify a plurality of reference points associated with an environment of the AV;
  - determine i) first estimated locations of each of the plurality of reference points using a first sensing data collected by a first sensor and ii) second estimated locations of each of the plurality of reference points using a second sensing data collected by a second sensor; and
  - adjust one or more parameters of at least one of the first sensor or the second sensor based on a loss function that assigns unequal weights to radial differences of the first estimated locations and the second estimated locations and lateral differences of the first estimated locations and the second estimated locations.

9. The system of claim 8, wherein the first sensor comprises a first camera sensor and the second sensor comprises at least one of a second camera sensor, a lidar sensor, or a radar sensor.

10. A method comprising:
- collecting sensing data, using a plurality of sensors of a sensing system of an autonomous vehicle (AV);
- identifying, based on the collected sensing data, a first reference point associated with a first object in an environment of the AV;
- determining i) a first estimated location of the first reference point using a first sensing data obtained by a first subset of the plurality of sensors and ii) a second estimated location of the first reference point using a second sensing data obtained by a second subset of the plurality of sensors; and
- adjusting one or more parameters of at least one sensor of the plurality of sensors based on a loss function that weights differently a difference of the first estimated location and the second estimated location and a lateral difference of the first estimated location and the second estimated location.

11. The method of claim 10, further comprising:
- identify a second reference point associated with a second object in the environment of the AV; and
- determining i) a third estimated location of the second reference point using the first sensing data and ii) a fourth estimated location of the second reference point using the second sensing data; and
- wherein the loss function is further representative of a difference between the third estimated location and the fourth estimated location.

12. The method of claim 10, wherein the plurality of sensors comprise one or more of a camera sensor, a lidar sensor, or a radar sensor.

13. The method of claim 10, wherein the one or more adjusted parameters comprise a direction of view of a camera sensor.

14. The method of claim 13, wherein the direction of view is associated with an optical axis of the camera sensor.

15. The method of claim 10, wherein the loss function comprises at least one of a square error loss function, a mean absolute error function, a Huber function, a cross entropy function, or a Kullback-Leibler function.

16. The method of claim 10, wherein the one or more parameters are adjusted during a down-time of the AV.

* * * * *